United States Patent
Brockmann et al.

[11] 3,723,411
[45] Mar. 27, 1973

[54] BETA-RHODOMYCIN V

[75] Inventors: Hans Brockmann, Goettingen; Martin Scheer, Wuppertal-Elberfeld, both of Germany

[73] Assignee: Farbenfabriken Bayer Aktiengesellschaft, Leverkusen, Germany

[22] Filed: Mar. 12, 1971

[21] Appl. No.: 123,882

[30] Foreign Application Priority Data

Mar. 18, 1970 Germany..................P 20 12 808.9

[52] U.S. Cl. ..............260/210 AB, 424/180, 195/80
[51] Int. Cl..............................................C07c 47/18
[58] Field of Search....................260/210 AB, 210 R

[56] References Cited

OTHER PUBLICATIONS

Bayer, "Chem. Abst.," Vol. 53, 1959, p. 4663(b).
Brockmann et al., "Chem. Abst.," Vol. 70, 1969, p. 97116y.

Primary Examiner—Lewis Gotte
Assistant Examiner—Johnnie R. Brown
Attorney—McCarthy, DePaoli, O'Brien & Price

[57] ABSTRACT

An antibiotic designated β-rhodomycin V and corresponding to the formula

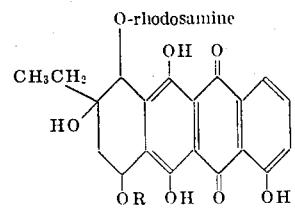

wherein R represents a tetraglycoside consisting of 2 mols rhodinose, 1 mol 2-desoxy-fucose and 1 mol rhodosamine is prepared by cultivating *Streptomyces purpurascens*, extracting the culture filtrate and mycelium in a neutral medium and obtaining the antibiotic from the extracts by known methods. The antibiotic is found to possess excellent activity against a broad class of organisms, especially mycoplasmas and gram-positive bacteria.

1 Claim, No Drawings

BETA-RHODOMYCIN V

BACKGROUND OF THE INVENTION

1. Field of the Invention

The present invention relates in general to the field of antibiotics, more particularly to a new member of the class of rhodomycins.

2. Description of the Prior Art

The rhodomycins are closely interrelated and are nitrogen-containing bases which usually occur as mixtures. They are red dyestuffs.

German Patent No. 851,398 is directed to a process for the production of antibiotically active substances, which is characterized in that streptomycetes, especially *Streptomyces purpurascens nov. spec.*, are allowed to grow under aerobic conditions on or in nutrient media known for the cultivation of streptomycetes and the rhodomycins are obtained from the resultant cultures by usual methods.

The subject matter of German Patent No. 913,813 is the preparation of a crystallized rhodomycin hydrochloride, designated therein as rhodomycin-A hydrochloride.

SUMMARY OF THE INVENTION

The subject-matter of the present invention is a new β-rhodomycin called β-rhodomycin V and corresponding to the formula

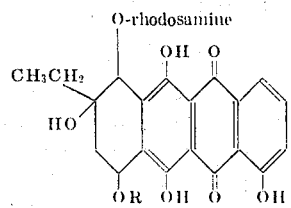

R = tetraglycoside
from 2 mol rhodinose, 1 mol 2-desoxy-fucose and 1 mol rhodosamine.

This new rhodomycin is distinguished from the known rhodomycins in that it contains five sugar radicals, whereas the known rhodomycins, now called β-rhodomycins I and β-rhodomycins II, only contain one and two sugar radicals, respectively [Tetrahedron Letters, 1969, pages 415 to 419].

According to the invention, the new rhodomycin is prepared by cultivating *Streptomyces purpurascens*, extracting the culture filtrate and the mycelium in a neutral medium, and obtaining β-rhodomycin V from the extracts in known manner.

The process according to the invention is thus distinguished from the known processes for the production of the known rhodomycins in that the extraction is here carried out in a neutral medium whereas in the earlier patents mentioned above the extraction is carried out in an acidic medium.

All species of streptomycetes are suitable starting materials for the process according to the invention. *Streptomyces purpurascens* Ist 313 is particularly suitable. Neutral extraction means in the present case an extraction at a pH value of 6.5 to 7.5.

β-Rhodomycin V has an excellent chemotherapeutic, especially antibacterial activity, as can be seen from the following results of tests in vitro.

Testing of the minimal inhibition concentration was carried out for the gram-positive and gram-negative causative organisms in the KLEIN medium (meat extract, peptone, dextrose, pH 7.1) at an incubation temperature of 37°C. for 24 hours, number of seeded germs $10^4$ germs/ml; and for mycoplasmas in PPLO broth (PPLO basic substrate, dextrose, equine serum, pH7.6) at an incubation temperature of 37°C. for 48 hours to 72 hours, number of seeded germs $10^7$ germs/ml.

TABLE 1

Minimal Inhibition Concentration (MIC)

(γ/ml nutrient medium) of β-rhodomycin V

| Type of germ | of strains | MIC γ/ml |
|---|---|---|
| Streptococci of different species | 5 | 0.015 to 1.00 |
| *Staphylococcus aureus* | 4 | 0.050 to 0.12 |
| Sarcinae | 2 | 0.060 to 1.00 |
| *Corynebacterium pyogenes* | 2 | 0.060 to 0.12 |
| *Pseudomonas aeruginosa* | 2 | 100 |
| *E. coli* | 2 | 50 |
| *Klebsiella pneumoniae* | 1 | 25 |
| *Salmonella* spec. | 2 | 50 to 200 |
| *Pasteurella multocida* | 2 | 6.25 |
| *Bordetella bronchiseptica* | 1 | 50 |
| *Alkaligenenes faecalis* | 1 | 25 |
| Mycoplasmas | | |
| avian mycoplasmas | 4 | 0.001 to 0.002 |
| bovine mycoplasmas | 2 | 0.030 to 0.060 |
| porcine mycoplasmas | 2 | 0.001 to 0.002 |

The values of the Table show that β-rhodomycin V has an excellent and unusually wide-ranging activity, especially against mycoplasmas and gram-positive bacteria.

The excellent and wide-ranging activity permits of their use in human as well as veterinary medicine; they can be used for the prophylaxis of bacterial infections but also for the treatment of already existing bacterial infections.

As indications for the field of veterinary medicine, there may be mentioned, for example, infections with mycoplasmas and intestinal infections. For prophylaxis, the β-rhodomycin V can be used as admixture to feeding stuff.

EXAMPLE 1

A 10 liters preliminary culture of *Streptomyces purpurascens* Ist 313 is incubated on a nutrient solution with 2 percent of soya flour and 2 percent mannitol submersed at 26°C. for 24 hours, transferred to 350 liters of a nutrient solution of the same composition, and fermented for 96 hours at 260°C. with stirring and aeration.

When the fermentation has been terminated, the red-brown culture broth is stirred with 20 kg kieselguhr and filtered. The culture filtrate and the mycelium are worked up separately. The mycelium is stirred three times with 60 liters of acetone each time, the combined orange-red acetone extracts are evaporated in a vacuum at 50°C. to a volume of 30 liters, extracted three times with 15 liters of butanol each time, and the combined butanol extracts are concentrated in a vacuum at 50°C. to volume of about 3 liters. The remaining red-brown oil is taken up with 10 liters chloroform (solution A).

The culture filtrate (350 liters, pH 7.0 to 7.5) is extracted with 150 liters butanol and the deep-red butanol phase is concentrated in a vacuum at 50°C. until there remain about 3 liters of a deep-red oil which is taken up with 10 liters chloroform (solution B).

The combined chloroform solutions A and B are distributed over six 100 × 10 cm columns of carboxymethyl cellulose (deposited with 2N hydrochloric acid; washed out (1) with water until the reaction is neutral, (2) with acetone and (3) with chloroform). Rinsing with 5 to 10 liters chloroform per column brings fats, anthracyclinones and non-basic anthracyclines into the filtrate.

The portion remaining on the column is eluted with 10 percent aqueous potassium hydrogen phosphate, and the deep-red eluate (5 liters per column) which has been adjusted to pH 8.0 with dilute ammonia is extracted three times with three liters of chloroform each time. The combined chloroform phases are evaporates to dryness in a vacuum, the residue is taken up with a little chloroform, and the red β-rhodomycin V is precipitated with petroleum ether (40° to 50°C.). Yield 150 to 170 mg per liter of culture broth.

2 g of the β-rhodomycin V preparation obtained as described above are chromatographed through a 100 × 4 cm cellulose column in a system butanol-0.7 m phosphate buffer pH 5.8 (1:1). The main zone (migrating fastest) is brought into the filtrate by rinsing with '''. r phase, dilute ammonia is then added to the filtrate until the pH is 8.0, the mixture is shaken with chloroform, and the chloroform phase, dried over sodium sulphate, is evaporated to dryness in a vacuum. The β-rhodomycin V remaining behind as a red lacquer is taken up with a little chloroform and precipitated in the form of a red powder or also of red needles at boiling temperature with cyclohexane. Melting point 173 to 175°C. (decomposition); $[a]^{20}_{313\ nm} -40 \pm 2°C, = 0.2$ in chloroform. $C_{54}H_{78}N_2O_{19}$ (1059.2)

Calc.: C 61.14; H 7.36; N 2.61
found:+ C 61.30; H 7.40; N 2.65

+ dried in a high vacuum at 100°C. for 15 hours.

IR (KBr compact) 3450, 2910, 1730, 1595/cm.

The β-rhodomycin V is readily soluble in methanol, butanol, acetone, chloroform, 0.7 m phosphate buffer pH 5.8, dilute acids; it is sparingly soluble in benzene, very sparingly soluble in water and virtually insoluble in cyclohexane.

What is claimed is:

1. β-Rhodomycin V of the formula

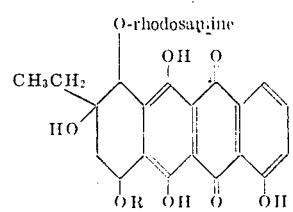

in which
R stands for a tetraglycoside radical consisting of 2 mol rhodinose, 1 mol 2-desoxy-fucose and 1 mol rhodosamine.

* * * * *